(12) United States Patent
Clark et al.

(10) Patent No.: US 9,732,944 B2
(45) Date of Patent: Aug. 15, 2017

(54) SOLID STATE LIGHT FIXTURES WITH INTEGRATED CONTROLS

(71) Applicant: Hubbell Incorporated, Shelton, CT (US)

(72) Inventors: Adam Joseph Clark, Bradenton, FL (US); Perry Romano, Bradenton, FL (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 15/143,144

(22) Filed: Apr. 29, 2016

(65) Prior Publication Data

US 2016/0323981 A1    Nov. 3, 2016

Related U.S. Application Data

(60) Provisional application No. 62/155,264, filed on Apr. 30, 2015, provisional application No. 62/155,166, (Continued)

(51) Int. Cl.

| H05B 37/02 | (2006.01) |
|---|---|
| F21V 15/01 | (2006.01) |
| F21V 23/00 | (2015.01) |
| F21V 23/04 | (2006.01) |
| H05B 33/08 | (2006.01) |
| F21V 29/77 | (2015.01) |
| F21V 21/116 | (2006.01) |
| F21V 21/30 | (2006.01) |

(Continued)

(52) U.S. Cl.
CPC .............. *F21V 15/01* (2013.01); *F21S 8/046* (2013.01); *F21V 21/116* (2013.01); *F21V 21/30* (2013.01); *F21V 23/007* (2013.01); *F21V 23/008* (2013.01); *F21V 23/04* (2013.01); *F21V 23/0435* (2013.01); *F21V 29/77* (2015.01); *H02J 9/06* (2013.01); *H05B 33/0803* (2013.01); *H05B 33/0809* (2013.01); *H05B 33/0845* (2013.01); *H05B 33/0851* (2013.01); *H05B 33/0854* (2013.01); *H05B 33/0866* (2013.01); *H05B 37/0272* (2013.01); *H05B 37/0281* (2013.01); *F21Y 2115/10* (2016.08)

(58) Field of Classification Search
CPC ............ H05B 37/0272; H05B 37/0245; F21V 29/507; F21V 29/70
USPC ........................................................ 316/86
See application file for complete search history.

(56) References Cited

U.S. PATENT DOCUMENTS

| 8,829,821 B2 | 9/2014 | Chobot et al. | |
|---|---|---|---|
| 2007/0145915 A1* | 6/2007 | Roberge | F21K 9/00 315/312 |

(Continued)

OTHER PUBLICATIONS

PCT International Search Report and Written Opinion mailed Aug. 30, 2016 from corresponding Application No. PCT/US2016/030239, 18 pages.

*Primary Examiner* — Don Le
(74) *Attorney, Agent, or Firm* — Dilworth IP LLC

(57) ABSTRACT

The present disclosure provides solid state lighting fixtures with wireless, sensor and time based controllers to establish configurations for illuminating the lighting fixtures. More particularly, the present disclosure relates to solid state lighting fixtures having a wireless controller that permits illumination intensity adjustments as well activation timing, and sensors that permit efficient optical control.

11 Claims, 14 Drawing Sheets

Related U.S. Application Data filed on Apr. 30, 2015, provisional application No. 62/155,293, filed on Apr. 30, 2015, provisional application No. 62/156,251, filed on May 2, 2015.

(51) Int. Cl.
*F21S 8/04* (2006.01)
*H02J 9/06* (2006.01)
*F21Y 115/10* (2016.01)

(56) References Cited

U.S. PATENT DOCUMENTS

| | | | |
|---|---|---|---|
| 2009/0034259 A1* | 2/2009 | Laufer | G01S 7/003 |
| | | | 362/253 |
| 2010/0271802 A1 | 10/2010 | Recker et al. | |
| 2011/0260652 A1* | 10/2011 | Hsieh | H05B 37/0272 |
| | | | 315/312 |
| 2012/0080944 A1* | 4/2012 | Recker | H02J 9/02 |
| | | | 307/25 |
| 2014/0001972 A1 | 1/2014 | Harris et al. | |
| 2014/0015415 A1* | 1/2014 | Lim | H05B 37/02 |
| | | | 315/131 |
| 2014/0070707 A1* | 3/2014 | Nagazoe | H04B 10/116 |
| | | | 315/151 |
| 2014/0239816 A1* | 8/2014 | Lee | H05B 33/0842 |
| | | | 315/130 |
| 2014/0285090 A1 | 9/2014 | Chemel et al. | |
| 2014/0354161 A1* | 12/2014 | Aggarwal | H05B 37/0245 |
| | | | 315/153 |
| 2015/0022123 A1* | 1/2015 | Van De Sluis | H05B 37/0245 |
| | | | 315/312 |
| 2015/0061505 A1* | 3/2015 | Asami | H05B 37/0218 |
| | | | 315/152 |
| 2015/0084519 A1 | 3/2015 | Scapa et al. | |

\* cited by examiner

SOLID STATE LIGHT FIXTURES WITH INTEGRATED CONTROLS

CROSS-REFERENCE TO RELATED APPLICATIONS

This application claims priority to U.S. Provisional Application No. 62/155,264, filed on Apr. 30, 2015, titled "Flexible Housing Assembly for SSL Light Fixtures," U.S. Provisional Application No. 62/155,166, filed on Apr. 30, 2015, titled "Solid State Light Fixtures with Integrated Controls," U.S. Provisional Application No. 62/155,293, filed on Apr. 30, 2015, titled "Control Device for Solid State Light Fixtures," and U.S. Provisional Application No. 62/156,251, filed on May 2, 2015, titled "Solid State Lighting Fixtures," all of which are hereby incorporated herein by reference in their entireties.

BACKGROUND

Field

The present disclosure relates to solid state lighting fixtures with wireless, sensor and time based controllers to establish configurations for illuminating the lighting fixtures. More particularly, the present disclosure relates to solid state lighting fixtures having a wireless controller that permits illumination intensity adjustments as well activation timing, and sensors that permit efficient optical control.

Description of the Related Art

Luminaires (light fixtures) utilizing light emitting diodes (LEDs) have in recent years become somewhat practical and continue to penetrate the lighting market due to the increased luminous efficacy of commercially available LED components. LED luminaires are desirable as they offer customers energy savings due to good luminous efficacy combined with the ability to precisely control light distribution patterns, which is of particular importance for certain lighting scenarios, such as outdoor environments, and open environments, such as parking garages and canopies. Another benefit of LED luminaires is that with the right control mechanism the LEDs are controllable. Each LED luminaire can start-up (i.e., illuminate) on a near-instantaneous basis, and may be dimmed to any level within the driver's operational range by varying the current through each LED via dimming drivers, e.g. power supplies, that offer dimming leads accepting the standard 0-10V input format.

Further energy savings of LED luminaires can be realized by providing light only where and when needed. For example, LED luminaires can be dimmed or turned off until motion is detected in an area. The LED luminaires can also be dimmed according to a time of day, or set to illuminate at full brightness from dusk through midnight or another time, and then dimmed, saving energy, but still providing an acceptable level of lighting for overnight security purposes. Selective dimming or on/off operation of LED luminaires also retards lumen depreciation and extends the service life of the LED luminaires.

Hard wired control devices have been developed for LED luminaires to capitalize on the above-noted potential for energy savings. Motion sensors, or timing devices have been hard-wired into LED luminaires and are set through manually controlled switches, e.g., DIP switches. Microprocessors programmed through a hand-held device via a wired connection, have also been used. However, on the fly changes to the LED luminaire settings are prohibitively laborious due to the need to manually change the hard-wired DIP switches or to establish a physical wired connection to each LED luminaire, resulting in no real cost savings. Other LED luminaire control devices run dimming leads from each LED luminaire to a central control panel. However, such central control panels are more complicated from a wiring perspective, typically requiring separate conduits for low voltage wiring, which makes them especially cumbersome for retrofit applications.

Wireless control devices have also been developed for LED luminaires. Such wireless control devices include a control module and an antenna within each luminaire, and one or more external computers that allow users to control the luminaires from the external computers that interface to the luminaires. However, currently available wireless lighting control devices suffer from distinct drawbacks. One such drawback is high cost sufficient to negate significant market penetration. Currently available wireless lighting control devices sell for over $100 per luminaire at wholesale, which means the retail price is significantly higher. Further, there are additional costs associated with the external "access points" needed to control the luminaires, which typically runs in the hundreds of dollars. Further, current wireless lighting control devices are typically complex to configure to specific site requirements for actual use of LED luminaires in the field. Configuring such LED luminaires requires professional field service personnel to go out into the field and configure the LED luminaires for the desired operational parameters, which comes at substantial cost to the customer. Another drawback is that currently available wireless lighting control devices are not self-contained within the luminaire such that they utilize external access points to set programmed schedules, and send commands to the individual luminaires to change illumination. Should the external computers fail, or wireless communications be impeded, the wireless lighting control device would fail to operate as intended. Another drawback is that currently available wireless lighting control devices are not designed for easy integration into the overall mechanical design of the LED luminaire, complicating the manufacturing process, increasing the potential for a lower quality finished product, and increasing fabrication costs.

SUMMARY

The present disclosure provides solid state lighting fixtures having a wireless controller that permits illumination intensity adjustments as well activation timing, and sensors that permit efficient optical control. In one exemplary embodiment, the SSL fixture for illuminating a desired area includes a ceiling mountable housing for installation in garages or canopies, an SSL light engine, and a wireless module. Preferably, the housing is made of a material that can transfer heat generated by the SSL light engine to the ambient air. The SSL light engine has a plurality of SSL elements that can be activated or dimmed in response to set time and date schedules to illuminate the desired area. The SSL light engine is positioned within the housing such that the plurality of SSL elements can illuminate the desired area. The wireless module is mounted to the SSL light engine and used for communicating with a controller using a wireless network.

BRIEF DESCRIPTION OF THE DRAWINGS

The figures depict embodiments for purposes of illustration only. One skilled in the art will readily recognize from the following description that alternative embodiments of the structures illustrated herein may be employed without departing from the principles described herein, wherein.

DETAILED DESCRIPTION

Figure 1:
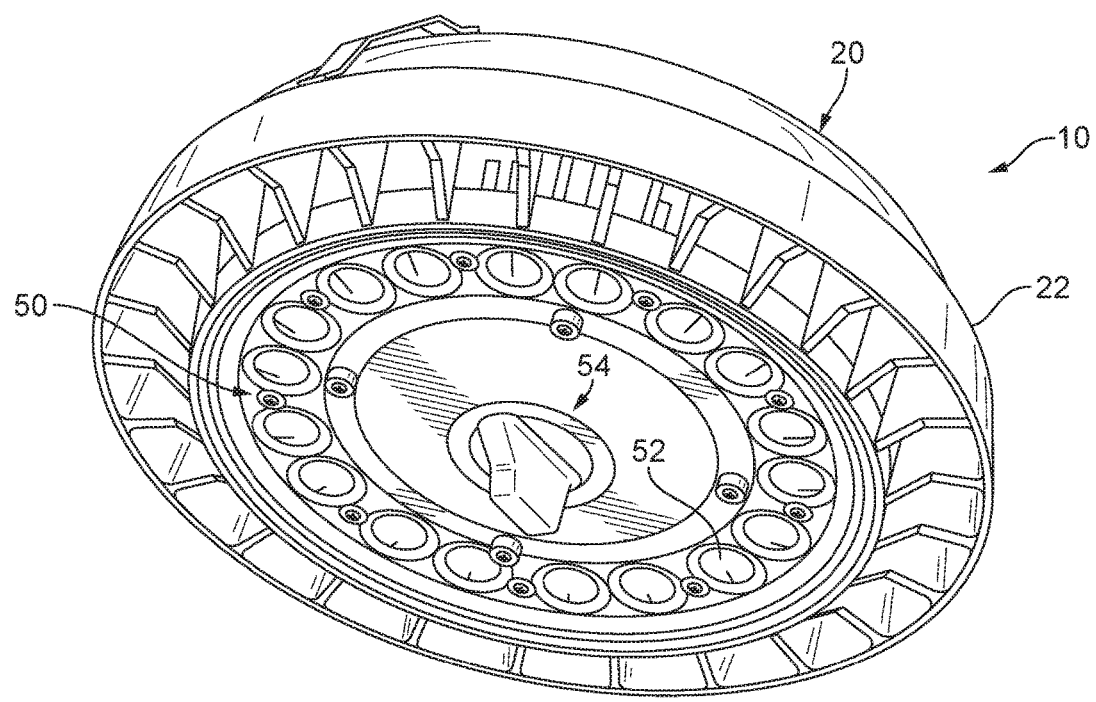
FIG. 1 is a perspective view of an exemplary embodiment of a solid state lighting fixture according to the present disclosure, illustrating a housing and a plurality of solid state lighting elements.
Figure 2:
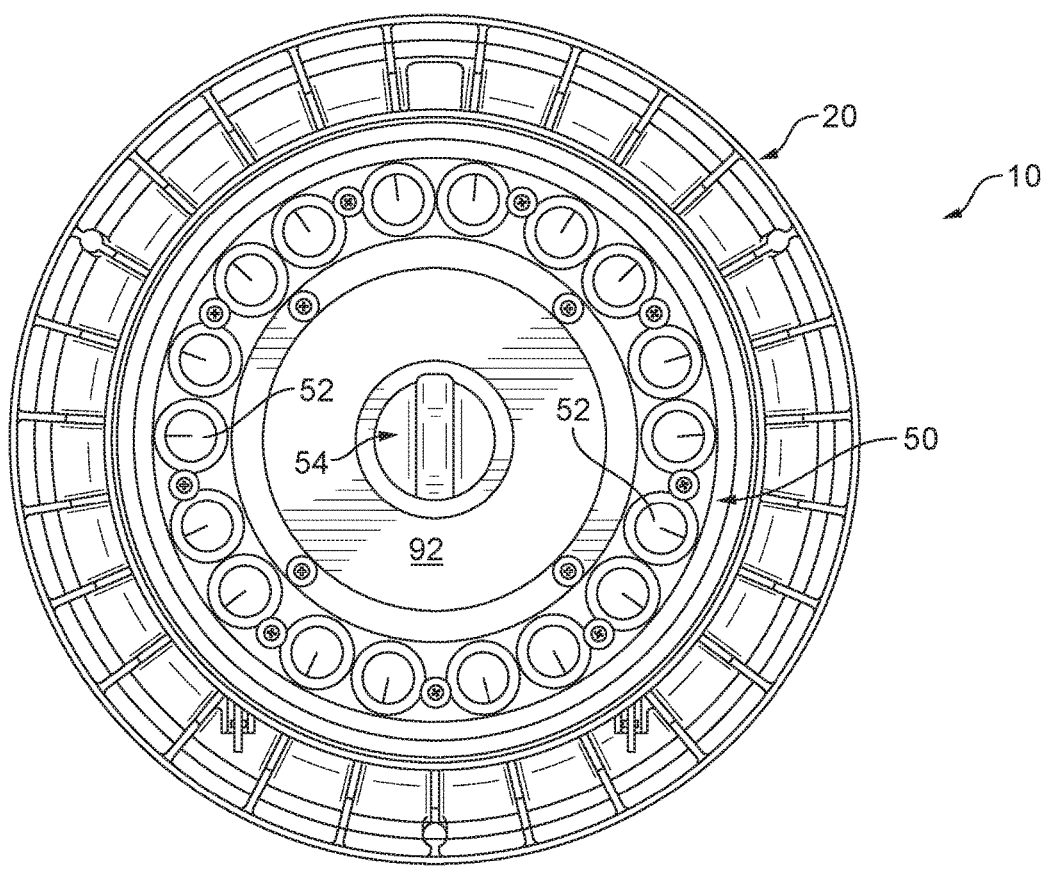
FIG. 2 is a bottom plan view of the solid state light fixture of FIG. 1.
Figure 3:
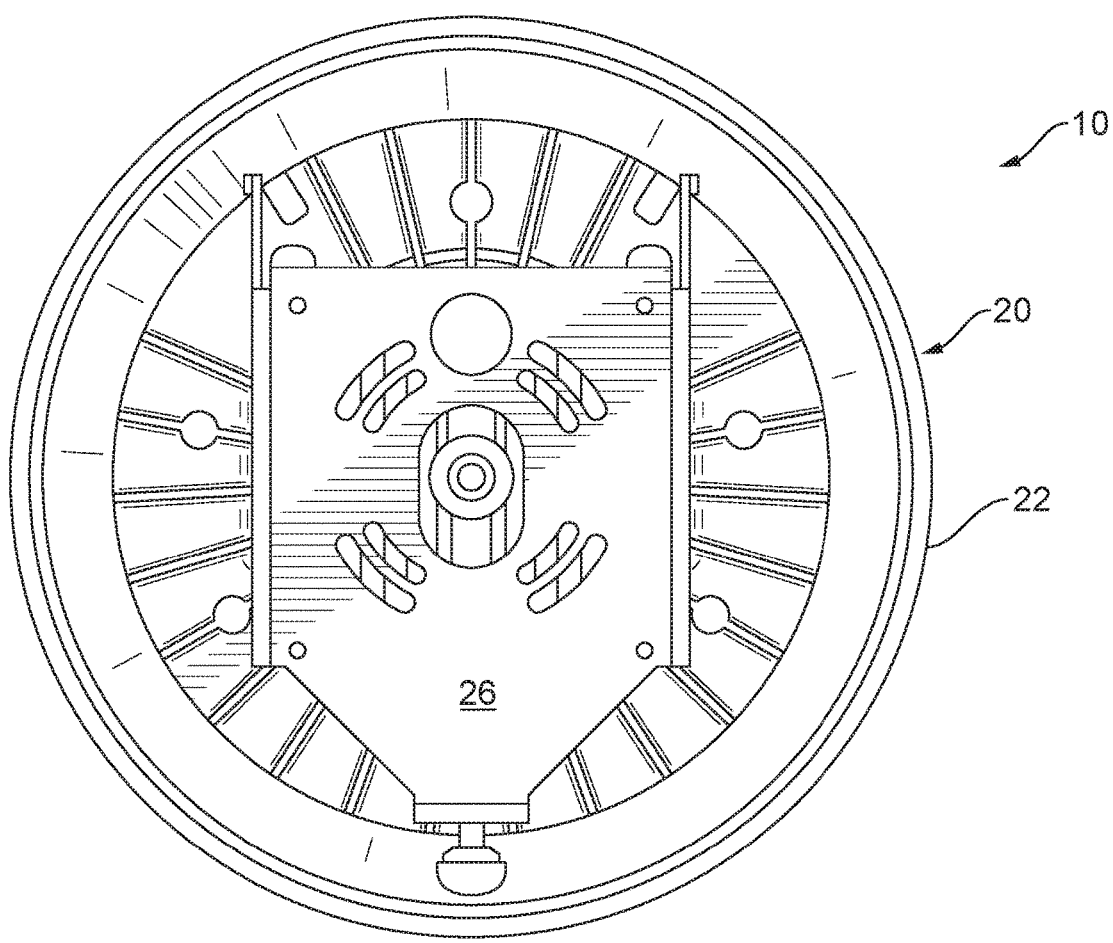
FIG. 3 is a top plan view of the solid state light fixture of FIG. 1.
Figure 4:
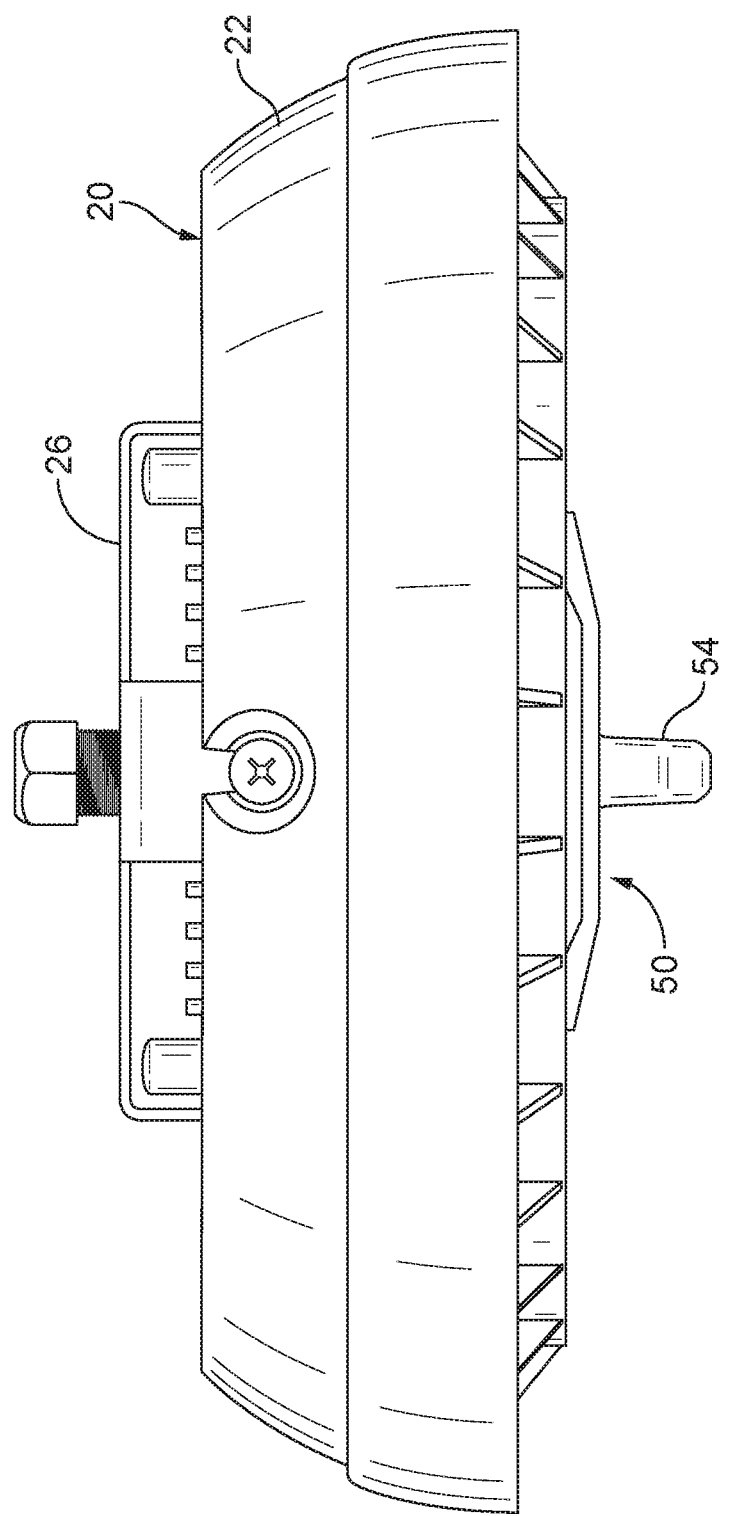
FIG. 4 is a side view of the solid state light fixture of FIG. 1.
Figure 5:
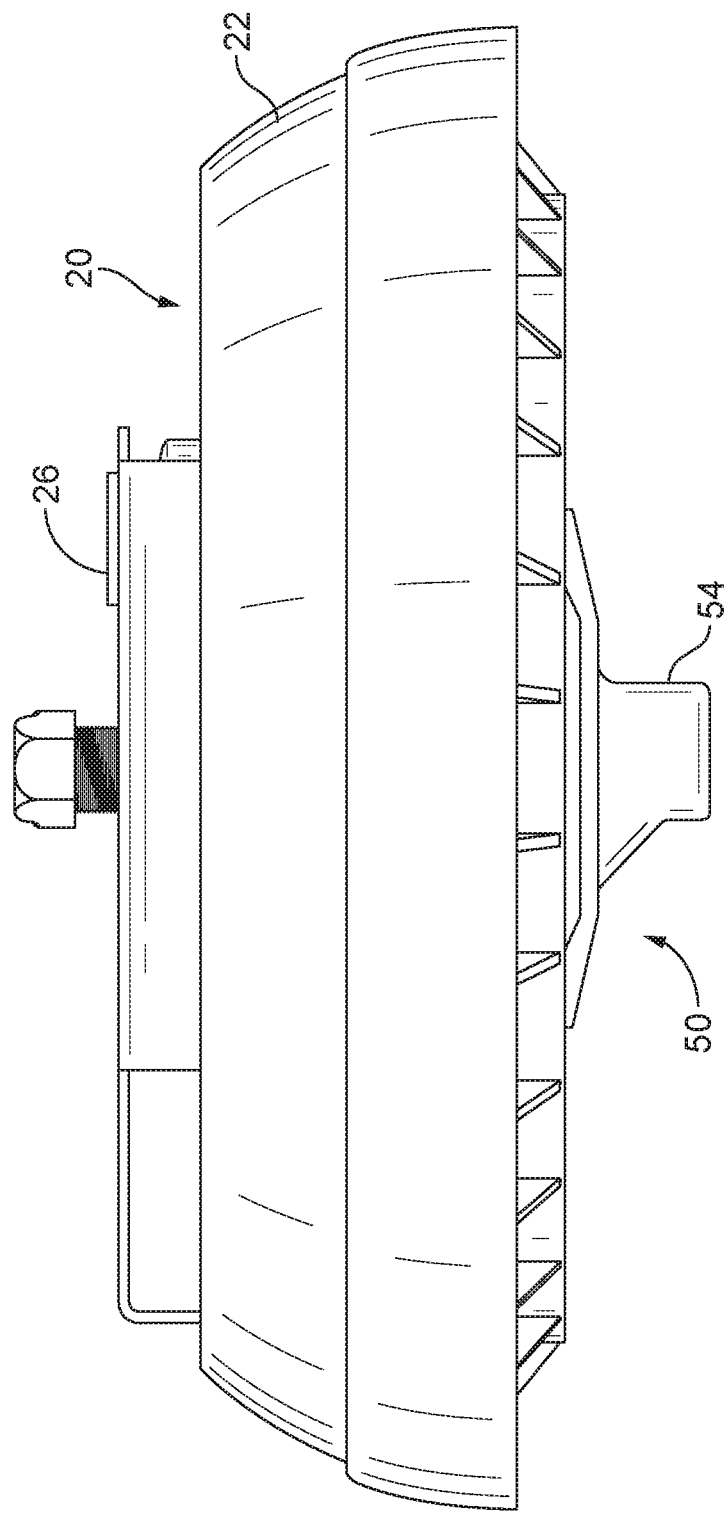
FIG. 5 is another side view of the solid state light fixture of FIG. 1.

Referring to FIGS. 1-5, various views of a solid state lighting (SSL) fixture 10 according to the present disclosure are shown. The SSL fixture 10 includes a housing assembly 20 and a SSL light assembly 50. In this exemplary embodiment, the housing assembly 20 includes an outer housing 22, an inner housing 24 and a mounting bracket 26. The outer housing is used to provide a mounting surface to connect the SSL fixture 10 to a mounting structure, such as a ceiling recessed or suspended junction box, and acts as a protective outer shell to protect the SSL light assembly 50 from the elements and damage. The mounting bracket 26 is used to mount the SSL fixture to a ceiling, wall, pole or other mounting structure that is to support the SSL fixture 10 and provide access to electrical power connections. In the embodiment shown in FIGS. 1-5, the mounting bracket 26 is a ceiling mounting bracket that secures the SSL fixture to a ceiling of a garage, such as a parking garage. The inner housing 24 supports to SSL light assembly 50. The housing assembly 20 can be made of metal, such as aluminum, die cast aluminum, stainless steel, galvanized steel or powder coated steel, or other rigid material to provide sufficient structural integrity and provide direct convective heat exchange between the SSL light assembly 100 and the ambient air.

Figure 6:
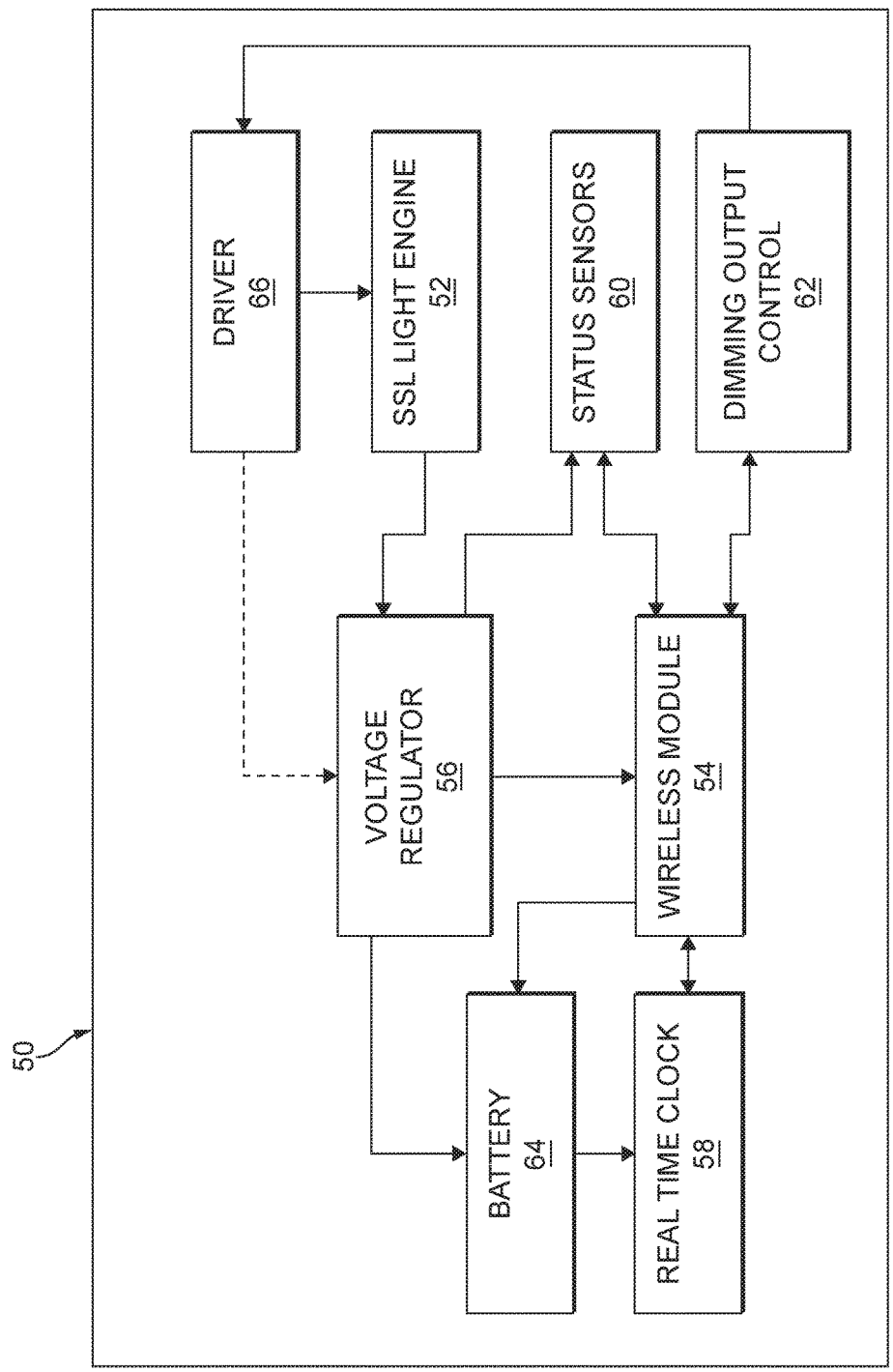
FIG. 6 is a block diagram of an embodiment of a solid state light fixture.
Figure 7:
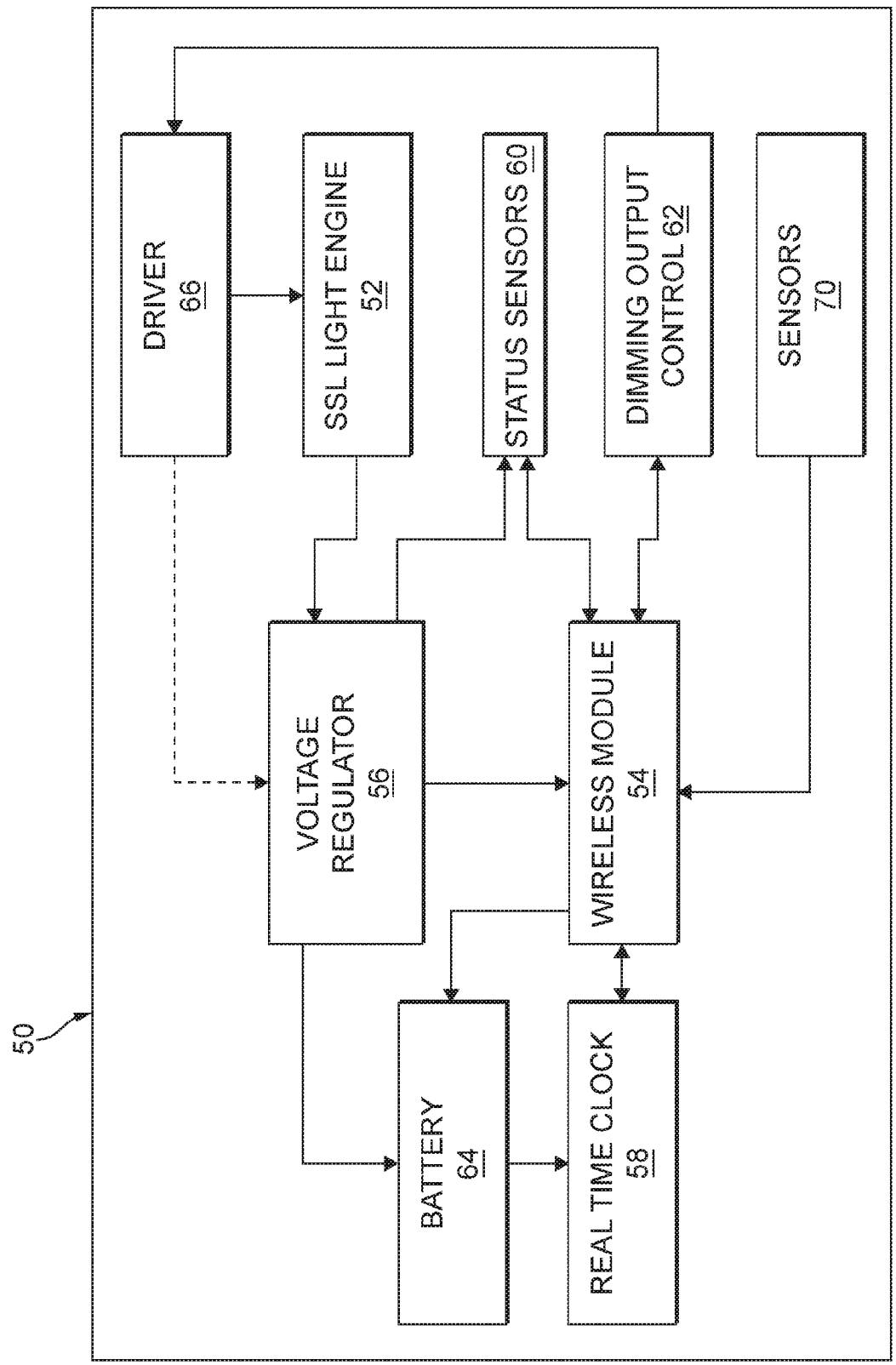
FIG. 7 is a block diagram of another embodiment of a solid state light fixture with at least one on-board sensor.

Referring to FIG. 6, an SSL light assembly 50 according to one embodiment of the present disclosure includes an SSL light engine 52, a wireless module 54, a voltage regulator 56, a real-time clock (RTC) 58, status sensors 60, dimming output control 62, battery back-up 64 and driver (or dc power supply) 66. The SSL light engine 52 has one or more SSL elements 90 used to illuminate a desired area. The SSL elements 90 may include any solid state lighting element, such as an LED lighting element. Preferably, the SSL light engine 52 includes a plurality of SSL elements 90 mounted to a printed circuit board referred to herein as primary board 92 in an array or other configuration capable of lighting a desired area. A plurality of SSL element lenses 94 may be positioned over the SSL elements, where one SSL element lens is positioned over an SSL element 90, or the lens 94 may be a one piece lens array. The SSL light engine 52 illuminates when energized by driver 66, and can be dimmed or brightened depending upon the voltage applied to the driver dimming input via the SSL light engine 52 under the control of the dimming output control 62. An example of a suitable driver is shown in FIGS. 35 and 36 of Appendix A of Patent Application No. 62/155,166, filed on Apr. 30, 2015, titled "Solid State Light Fixtures with Integrated Controls," incorporated herein by reference. In the exemplary embodiment of FIG. 6, the driver 66 is designed to simplify manufacturing by having the wiring integrated, including AC pigtails, and an output harness with a connector for plugging into the SSL light engine 52. Metal oxide varistors (MOVs) are integrated within the driver 66, which are normally a separate item for MOVs at the rating used herein, e.g., 20 kA. The driver's topology converts incoming AC energy to a ~450V DC bus to supply to the power converter for the SSL elements 90 in the SSL light assembly, and also an auxiliary power supply for the controls (including wireless module). Dimming control is in the pulse width modulated (PWM) format. The driver 66 is capable of driving the SSL light engine 52 down to zero current, i.e. extinguished, where the auxiliary power supply takes over to supply power to the wireless module, since no electrical current would be available from the SSL element 90 strings to support the wireless module controls. The wireless module acts as a wireless transceiver for receiving and transmitting data. The wireless module 54 is configured to transmit signals to the controller 110 (seen in FIG. 9), and receive signals from the controller 110 via wireless network 120. Voltage regulator 56 maintains a constant voltage supply, e.g., 3.3 volts, for the wireless module 54. The status sensors 60 are used to measure certain operating characteristics of the SSL light assembly 50, and may include temperature sensors, and sensors to measure current and voltage (including dim voltage). Measurements from the status sensors 60 are transmitted to the controller 110 via wireless module 54. The battery back-up 64 supplies power to the RTC 58 when external power is otherwise unavailable to the RTC 58, e.g., when there is a power outage or power to the SSL fixture is turned off. The battery back-up 64 enables the RTC to maintain accurate time so that the wireless module can perform scheduled operations without the need to reprogram the RTC. Embodiments of detailed circuit diagrams to implement the components disclosed in FIG. 6 are provided in Appendix A of Patent Application No. 62/155,166, filed on Apr. 30, 2015, titled "Solid State Light Fixtures with Integrated Controls," incorporated herein by reference. Note that the function of the DC power supply, including the driver, is to supply electrical power for all control circuitry, including the wireless module, clock, etc. This occurs when the fixture is energized, i.e., receiving external power. When external power is lost, correspondingly, the DC power supply will cease supplying power, and this is when the battery takes over to supply power to the real time clock.

Referring to FIGS. 7-11, an SSL light assembly 50 according to another embodiment of the present disclosure includes an SSL light engine 52, a wireless module 54, a voltage regulator 56, a real-time clock (RTC) 58, status sensors 60, dimming output control 62, battery back-up 64, driver (or dc power supply) 66 and one or more sensors 70, such as motion, and light or photo sensors. The SSL light engine 52 illuminates when energized by driver 66, and can be dimmed or brightened depending upon the voltage applied to the driver dimming input via the SSL light engine 52 under the control of the dimming output control 62. An example of a suitable driver is the driver described above with reference to FIGS. 35 and 36 in Appendix A of Patent Application No. 62/155,166, filed on Apr. 30, 2015, titled "Solid State Light Fixtures with Integrated Controls," incorporated herein by reference. The wireless module 54 is configured to transmit signals to the controller 110 (seen in FIG. 9), and receive signals from the controller 110. Voltage regulator 56 maintains a constant voltage supply, e.g., 3.3 volts, for the wireless module 54. The status sensors 60 are used to measure certain operating characteristics of the SSL light assembly 50, and may include temperature sensors, and sensors to measure current and voltage (including dim voltage). Measurements from the status sensors 60 are transmitted to the controller 110 via wireless module 54. The battery back-up 64 supplies power to the RTC 58 when power is otherwise unavailable to the RTC, e.g., when there is a power outage or power to the SSL fixture is turned off. The battery back-up 64 enables the RTC to maintain accurate time so that the wireless module can perform scheduled operations without the need to reprogram the RTC. The motion and/or photo sensors 70 can be used to control activation, deactivation or adjustment (e.g., dimming) of one or more SSL fixtures 10 within the SSL system 100 described below. An embodiment of a detailed circuit diagram to implement the components disclosed in FIG. 7 in Appendix A of Patent Application No. 62/155,166, filed on Apr. 30, 2015, titled "Solid State Light Fixtures with Integrated Controls," incorporated herein by reference.

Figure 8:
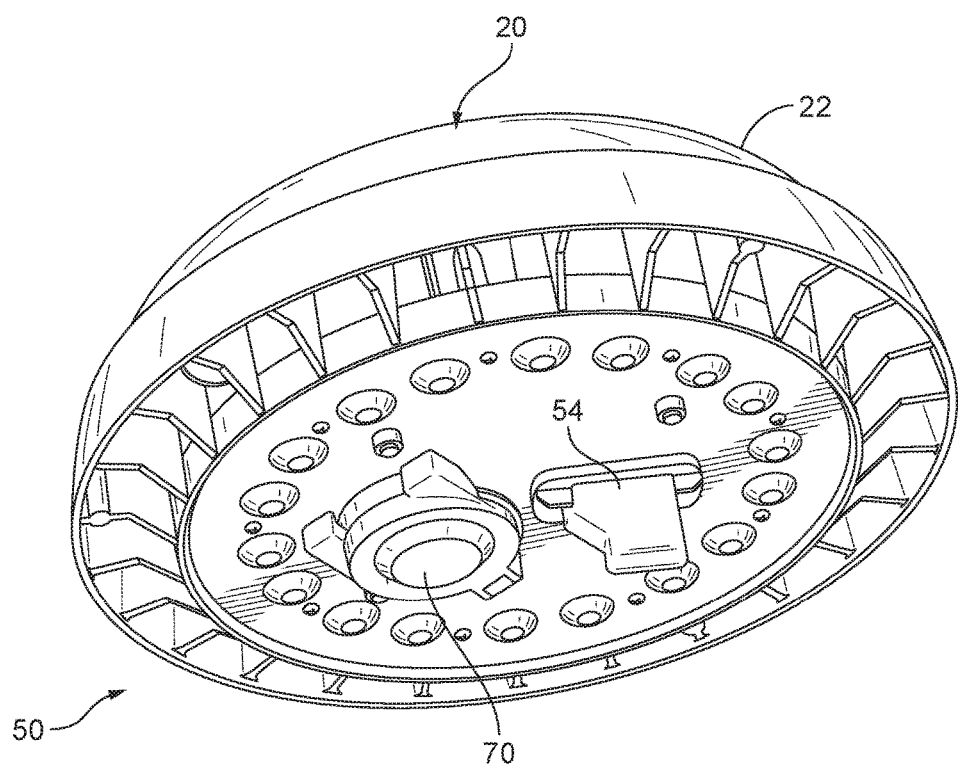
FIG. 8 is a perspective view of another exemplary embodiment of a solid state lighting fixture, illustrating a housing, a plurality of solid state lighting elements and a motion sensor.

Referring to FIG. 8, an SSL light assembly 50 according to another embodiment of the present disclosure includes an SSL light engine 52, a wireless module 54, a voltage regulator 56, a real-time clock (RTC) 58, status sensors 60, dimming output control 62, battery back-up 64, driver (or dc power supply) 66, and a motion sensor interface 80 in communication with an off the shelf motion sensor 82 enclosed within the SSL light assembly 50. The SSL light engine 52 illuminates when energized, and can be dimmed or brightened depending upon the voltage applied to the driver dimming input via the SSL light engine 54 under the control of the dimming output control 62. An example of a suitable driver is the driver described above with reference to FIGS. 35 and 36 of Appendix A of Patent Application No. 62/155,166, filed on Apr. 30, 2015, titled "Solid State Light Fixtures with Integrated Controls," incorporated herein by reference. The wireless module 54 is configured to transmit signals to the controller 110 (seen in FIG. 9) and receive signals from the controller 110, via the wireless network 120. Voltage regulator 56 maintains a constant voltage supply, e.g., 3.3 volts, for the wireless module 54. The status sensors 60 are used to measure certain operating characteristics of the SSL light assembly 50, and may include temperature sensors, and sensors to measure current and voltage (including dim voltage). Measurements from the status sensors 60 are transmitted to the controller 110 via wireless module 54. The battery back-up 64 supplies power to the RTC 58 when power is otherwise unavailable to the RTC, e.g., when there is a power outage or power to the SSL fixture is turned off. The battery back-up 64 enables the RTC 58 to maintain accurate time so that the wireless module can perform scheduled operations without the need to reprogram the RTC. In this embodiment, the motion sensor interface 80 is configured to interface with off the shelf motion sensors and provides signals to the wireless module 54 and can be used to control activation, deactivation or adjustment of one or more SSL fixtures 10 within the SSL system 100 described below. An embodiment of a detailed circuit diagram to implement the components disclosed in FIG. 8 is provided in Appendix A of Patent Application No. 62/155, 166, filed on Apr. 30, 2015, titled "Solid State Light Fixtures with Integrated Controls," incorporated herein by reference.

Figure 9:
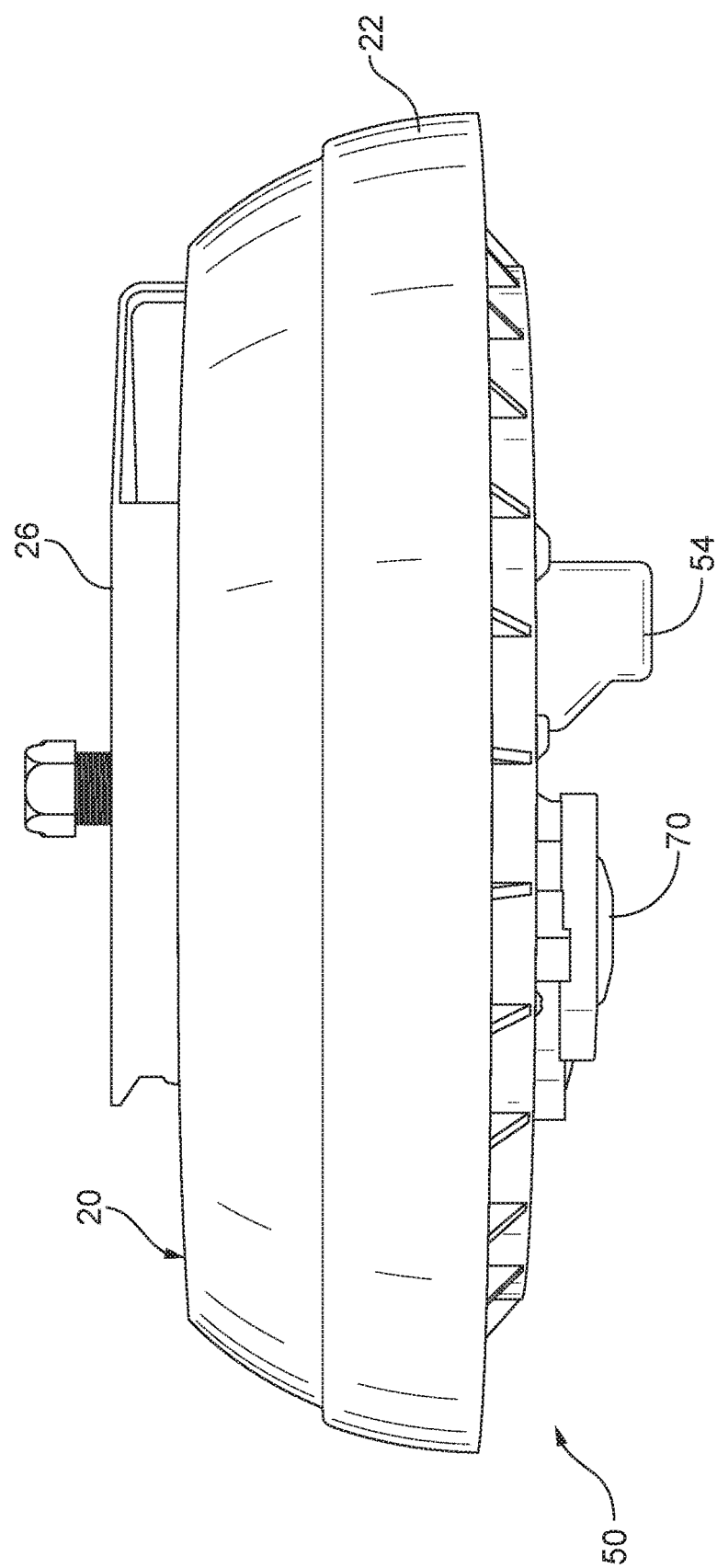
FIG. 9 is a side view of the solid state light fixture of FIG. 8.
Figure 10:
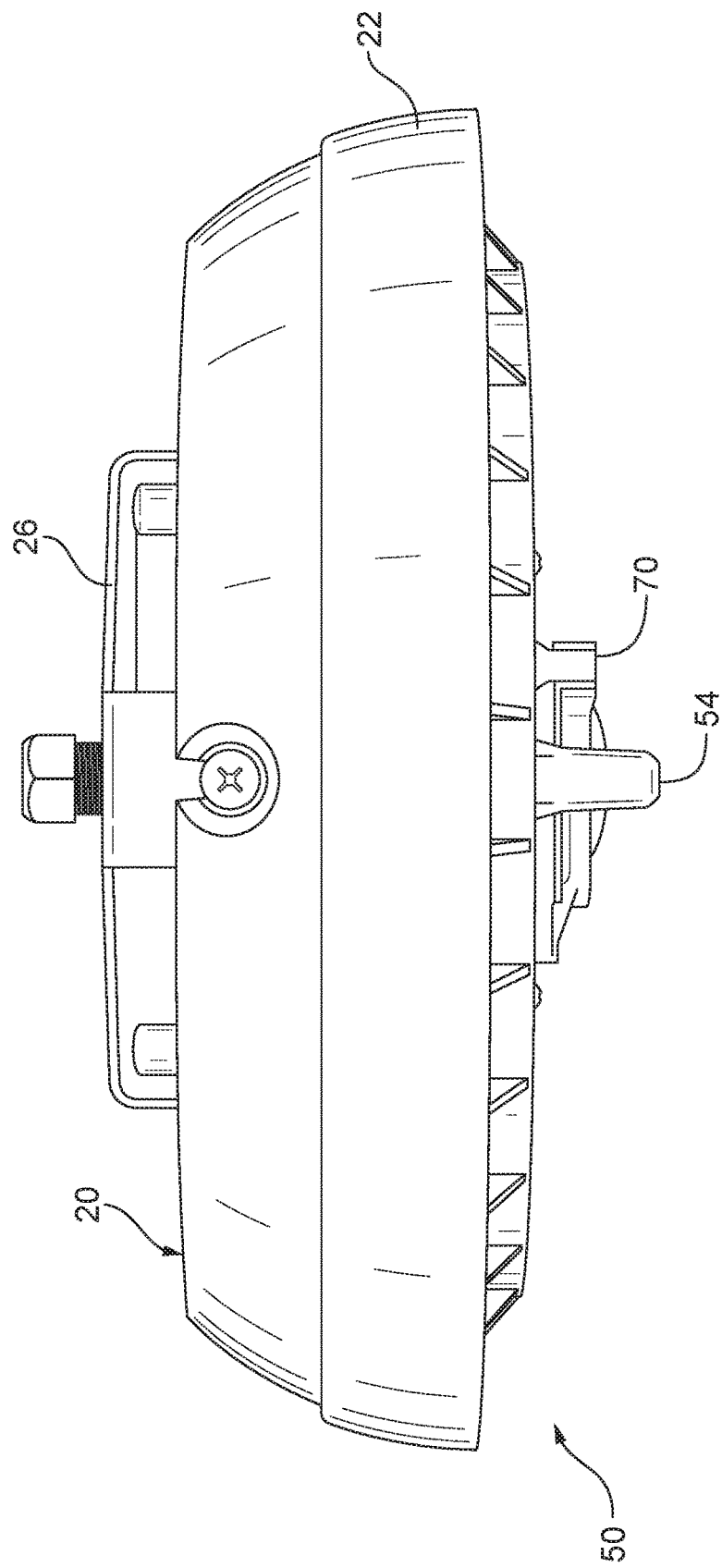
FIG. 10 is another side view of the solid state light fixture of FIG. 8.
Figure 11:
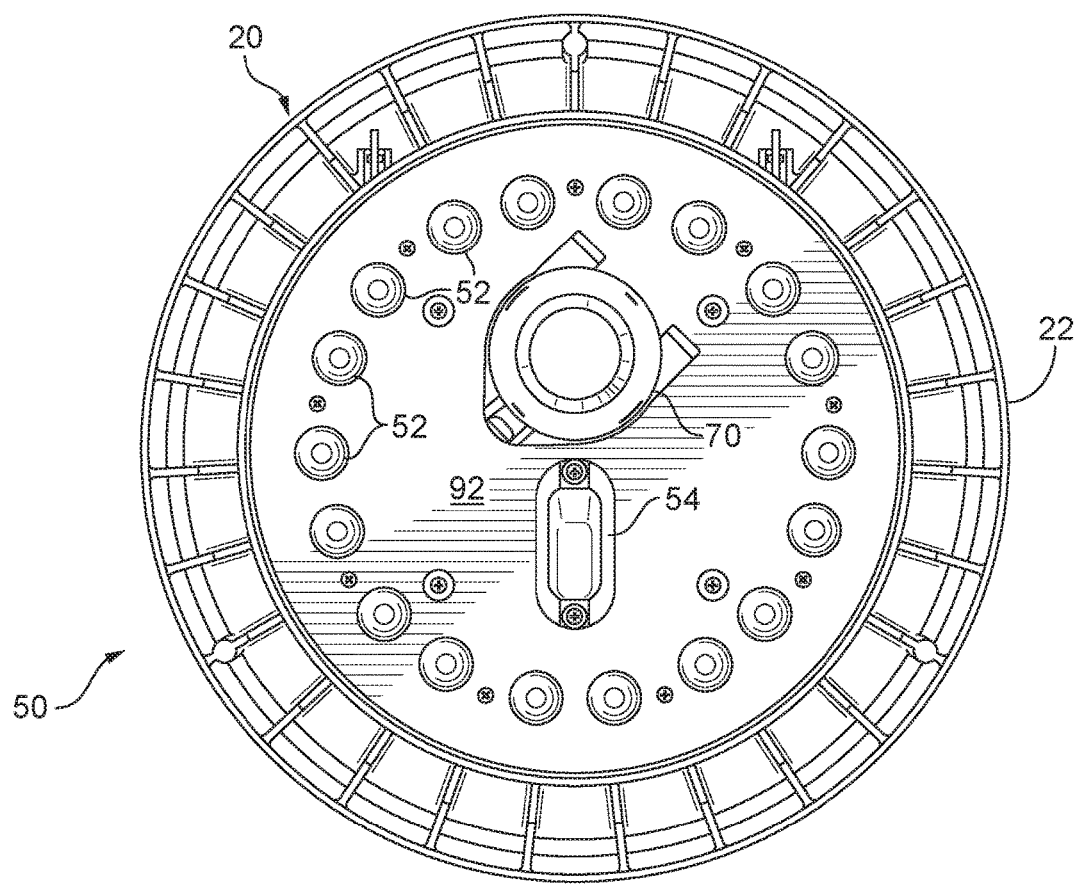
FIG. 11 is a bottom plan view of the solid state light fixture of FIG. 8.
Figure 12:
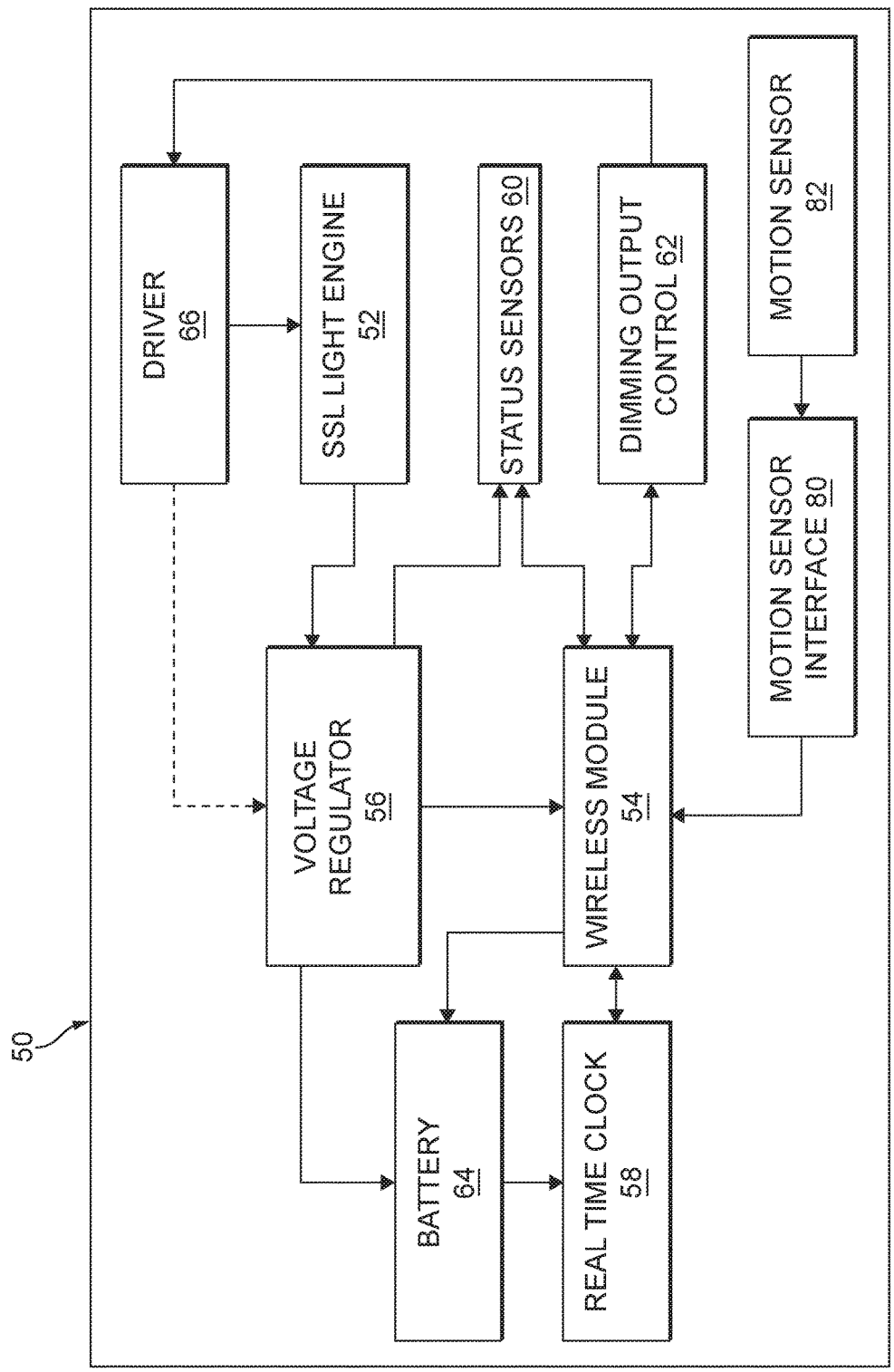
FIG. 12 is a block diagram of another embodiment of the solid state light fixture with an external motion sensor.
Figure 13:
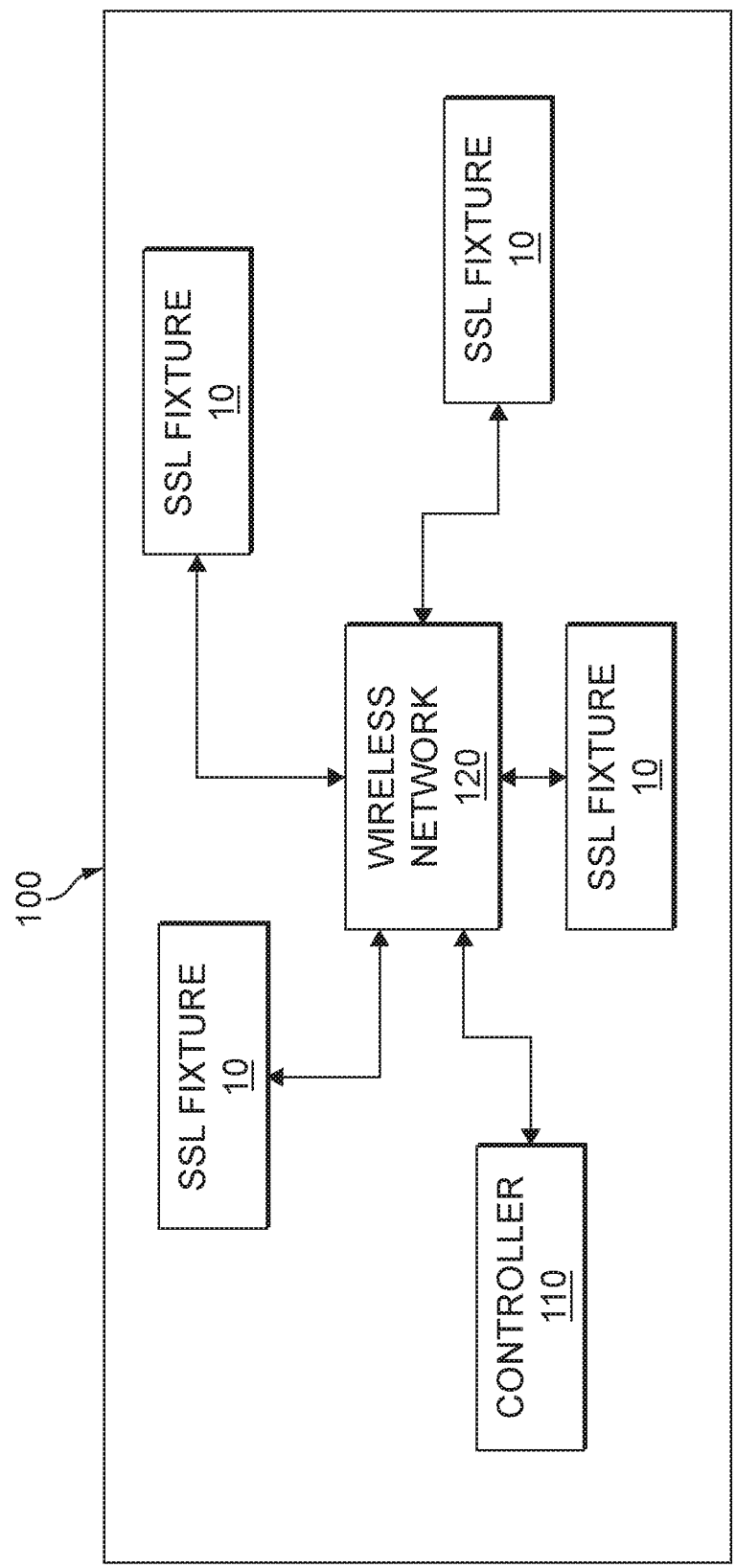
FIG. 13 is a block diagram of an embodiment of the solid state light system.
Figure 14:
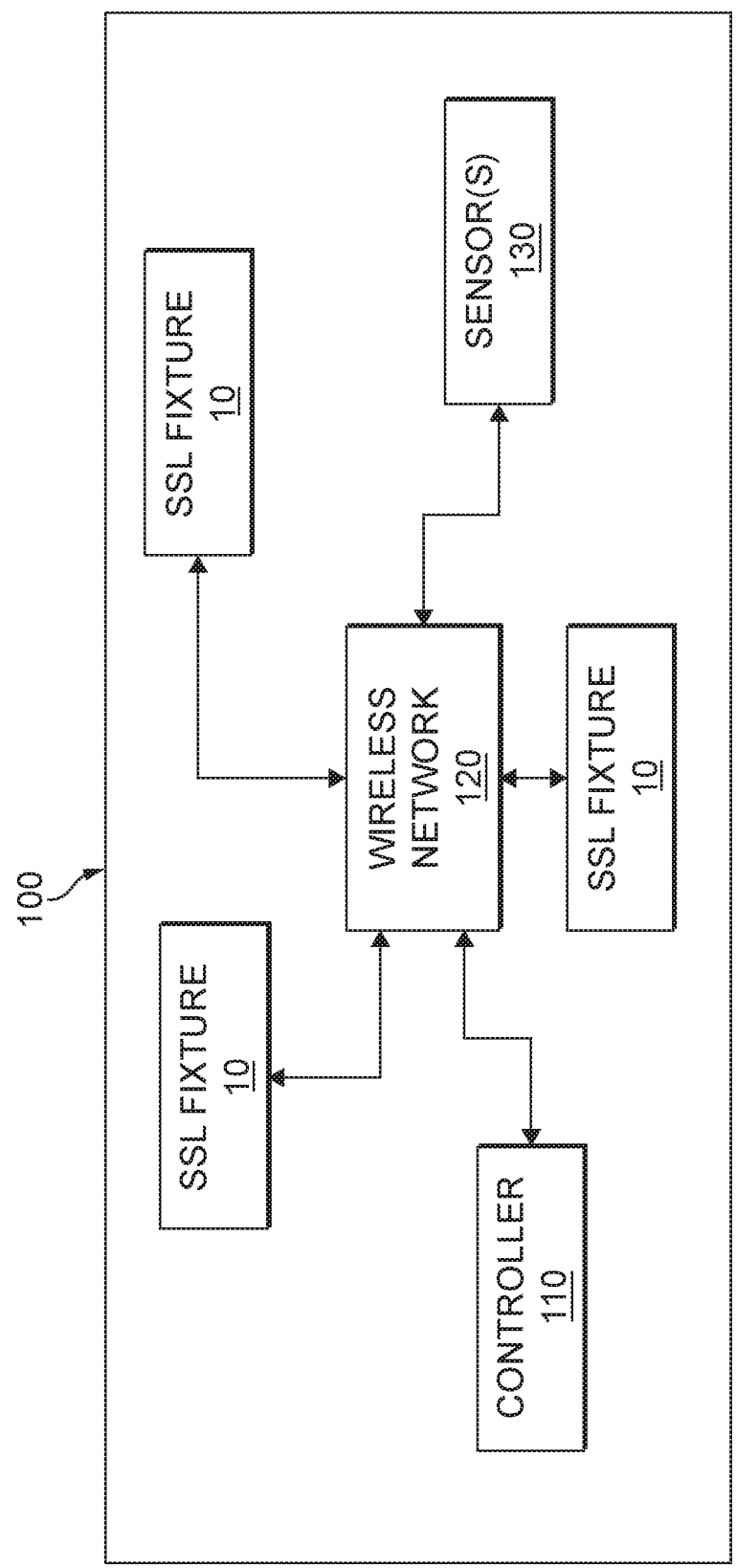
FIG. 14 is a block diagram of another embodiment of the solid state light system.

Referring to FIGS. 9 and 10, an SSL garage or canopy lighting system 100 (also referred to herein as SSL system) according to exemplary embodiments of the present disclosure are shown. In these exemplary embodiments, the SSL system includes at least one SSL fixture 10, a controller 110 that can be used to program or otherwise provide commands, instructions, or program code to each SSL fixture 10 and a wireless network 120 interconnecting each device within the SSL system 100. Preferably, the SSL system 100 includes a plurality of SSL fixtures 10, as seen in FIG. 9. Examples of suitable controllers 110 include personal computers, mobile computing devices, such as a smartphone or tablets, or dedicated fixed or portable computing devices capable of providing real-time control of one or more SSL fixtures used to illuminate a desired area. The controller 110 may communicate to the wireless network 120 through, for example, a bridge node. The bridge node may be a USB wireless adapter, such as the Snap Stick 200 USB dongle manufactured by Synapse. The wireless network 120 is preferably a mesh network, which is also capable of communicating with individual SSL fixtures 10 that are outside the mesh network. When communicating with individual SSL fixtures outside the mesh network, SSL fixtures can be controlled by the controller 110 when it is in close proximity to the SSL fixture and using, for example, the USB wireless adapter (e.g., the SNAP Stick 200 USB dongle). FIG. 10 is an embodiment of the SSL system 100 similar to the embodiment of FIG. 9, except the SSL system also includes one or more sensors 130, such as a light sensor, or motion sensor, or a combination of sensors. The sensors 130 are external to the SSL fixtures 10, and are used to control one or more SSL fixtures via the wireless network 120. A more detailed description of the controller 110 and wireless network 120 is provided in Appendix A of Patent Application No. 62/155, 166, filed on Apr. 30, 2015, titled "Solid State Light Fixtures with Integrated Controls," incorporated herein by reference.

The signals sent to the wireless module 54 by the controller 110, via the wireless network 120, may include generally, user commands, such as set schedule command, manual control of fixture, turn fixture off, turn fixture on, dim fixture, set schedule to automatically dim fixture, or to activate fixture upon one or more sensor responses. Such commands can be sent to one SSL fixture 10 or to more than one SSL fixture. Signals sent to the controller 110 by the wireless module 54 may include diagnostic information from, for example, the status sensors 60, such as printed circuit board temperature, the number of kilowatt hours the SSL fixture has been operating, the RTC time, and other information reflecting that one or more SSL fixture components are not functioning properly and are in need of repair, such as RTC status, battery status, etc. Signals sent to the controller 110 by the wireless module 54 may also include acknowledgements that commands from the controller have been received. The real-time clock (RTC) 58 provides a suitably accurate clock to the SSL fixture 10 components to ensure timing operations are performed at a desired time of day. More details of these components are described in Appendix A of Patent Application No. 62/155,166, filed on Apr. 30, 2015, titled "Solid State Light Fixtures with Integrated Controls," incorporated herein by reference.

It will be understood that various modifications can be made to the embodiments of the present disclosure herein without departing from the spirit and scope thereof. Therefore, the above description should not be construed as limiting the disclosure, but merely as embodiments thereof. Those skilled in the art will envision other modifications within the scope and spirit of the invention as defined by the claims appended hereto.

What is claimed is:

1. An SSL system for illuminating a desired area, comprising:
   one or more ceiling mountable SSL fixtures that can be arranged to illuminate a desired area, wherein each ceiling mountable SSL fixture includes an SSL light engine and a wireless module mounted to the SSL light engine for communicating with a controller using a wireless network, wherein the controller stores setting and identification information of each SSL fixture and is capable of sending information to each SSL fixture using the wireless network, wherein the wireless module interfaces with a real time clock for controlling at least in part the illumination of the SSL light engine in accordance with stored settings representing times of day and brightness, and a back-up battery to supply power to the real time clock in the event external power to the real time clock is lost.

2. The SSL system of claim 1 wherein, the wireless module is integrated into the SSL light engine.

3. The SSL system of claim 1, further comprising:
   a voltage regulator electrically coupled to the wireless module for providing voltage to the wireless module.

4. The SSL system of claim 1, further comprising:
   a dimming output control to selectively dim or brighten the SSL light engine.

5. An SSL fixture for illuminating a desired area, comprising:
   a ceiling mountable housing for installation in garages or canopies;
   an SSL light engine having a plurality of SSL elements that can be activated or dimmed in response to set time and date schedules to illuminate the desired area, wherein the SSL light engine is positioned within the housing such that the plurality of SSL elements can illuminate the desired area;
   a wireless module mounted to the SSL light engine and used for communicating with a controller using a wireless network, wherein the wireless module interfaces with a real time clock for controlling at least in part the illumination of the SSL light engine in accordance with stored settings representing times of day and brightness, and a back-up battery to supply power to the real time clock in the event external power to the real time clock is lost; and
   wherein the housing is made of a metal that can transfer heat generated by the SSL light engine to the ambient air.

6. The SSL fixture of claim 5, further comprising:
   a voltage regulator electrically coupled to the wireless module for providing voltage to the wireless module.

7. The SSL fixture of claim 5, further comprising:
   a dimming output control to selectively dim or brighten the SSL light engine.

8. An SSL fixture for illuminating a desired area, comprising:
   a ceiling mountable housing for installation in garages or canopies;
   an SSL light engine having a plurality of SSL elements that can be activated and dimmed in response to set time and date schedules to illuminate the desired area, wherein the SSL light engine is positioned within the housing such that the plurality of SSL elements can illuminate the desired area;
   a wireless module mounted to the SSL light engine and used for communicating with a controller using a wireless network and wherein the wireless module interfaces with a real time clock for controlling at least in part the illumination of the SSL light engine in accordance with stored settings representing times of day and brightness, and a back-up battery to supply power to the real time clock in the event external power to the real time clock is lost; and
   wherein the housing is made of a material that can transfer heat generated by the SSL light engine to the ambient air.

9. The SSL fixture of claim 8, further comprising:
   a voltage regulator electrically coupled to the wireless module for providing voltage to the wireless module.

10. The SSL fixture of claim 8, further comprising:
    a dimming output control to selectively dim or brighten the SSL light engine.

11. The SSL fixture of claim 8, further comprising:
    a sensor communicatively coupled to the wireless module for sensing at least one of light and motion.

* * * * *